United States Patent [19]
Kanao et al.

[11] Patent Number: 6,038,064
[45] Date of Patent: Mar. 14, 2000

[54] ILLUMINATION APPARATUS FOR OPTICAL INSTRUMENT

[75] Inventors: Masato Kanao, Ina; Hideto Yamashita, Minamiminowamura, both of Japan

[73] Assignee: Olympus Optical Co., Ltd., Tokyo, Japan

[21] Appl. No.: 09/082,944

[22] Filed: May 21, 1998

[30] Foreign Application Priority Data

May 27, 1997 [JP] Japan .................................. 9-137034
May 13, 1998 [JP] Japan ................................ 10-130487

[51] Int. Cl.[7] .......................... G02B 13/14; G02B 21/16; G02B 7/02
[52] U.S. Cl. ......................... 359/355; 359/385; 359/390; 359/722; 359/819
[58] Field of Search .................................. 359/385, 390, 359/388, 722, 819, 355

[56] References Cited

U.S. PATENT DOCUMENTS 5,418,583  5/1995  Masumoto ............................... 353/38

FOREIGN PATENT DOCUMENTS

59-180501  10/1984  Japan ..................................... 359/742
62-11818   1/1987   Japan .

*Primary Examiner*—Jon Henry
*Attorney, Agent, or Firm*—Frishauf, Holtz, Goodman, Langer & Chick, P.C.

[57] ABSTRACT

An illumination apparatus for an optical instrument includes an illumination section for outputting illumination light, and a lens made of rubber and arranged on the optical path of the illumination light output from the illumination section.

26 Claims, 6 Drawing Sheets

ILLUMINATION APPARATUS FOR OPTICAL INSTRUMENT

BACKGROUND OF THE INVENTION

The present invention relates to an illumination apparatus for an optical instrument and, more particularly, to an illumination apparatus for an optical microscope.

An illumination apparatus for an optical microscope has conventionally been known as one of illumination apparatuses for optical instruments with an illumination system having a lens such as a glass lens or a hard plastic lens (polycarbonate or acrylic lens).

In a lens made of an optical glass, its transmittance generally abruptly decreases from a wavelength of about 330 nm, and the lens hardly transmits light with a wavelength in the ultraviolet range. For this reason, when an ultraviolet light source is required to observe a sample or the like with a fluorescent or ultraviolet microscope, a lens made of a special material such as quartz or fluorite has conventionally been used.

The ultraviolet transmission wavelength range of the lens made of quartz or fluorite is however limited to 200 to 300 nm. Further, a special material such as quartz is very expensive and must be polished, resulting in high lens cost. Such a lens is therefore difficult to use in a low-cost optical microscope.

Some optical microscopes employ plastic lenses which can be manufactured at lower costs. However, the transmission wavelength of the plastic lens is limited similarly to the glass lens.

In the plastic lens, the heat deformation temperature of the material used is about 100° C. Accordingly, if the plastic lens is used near the light source lamp, optical characteristics may degrade due to heat deformation.

In fixing an optical element inside the microscope, the lens made of an optical glass is generally adhered to a frame directly, or fitted in the frame and then pressed by a press ring.

Adhering the optical element to the frame requires an adhesive, and a long time is necessary to completely fix the optical element. In addition, attention must be paid to the operation process and the operation environment. Even pressing the lens made of an optical glass with the press ring requires another press ring. The press ring must be screwed or adhered to prevent looseness.

BRIEF SUMMARY OF THE INVENTION

The present invention has been made in consideration of the above situation, and has as its object to provide an illumination apparatus for an optical instrument with an inexpensive optical element which exhibits a high ultraviolet transmittance and does not degrade in optical characteristics by heat deformation or the like even if the element is exposed to high temperatures near a light source lamp.

It is another object of the present invention to provide an illumination apparatus for an optical instrument in which an optical element can be easily fixed.

To achieve the above objects, according to the first aspect of the present invention, there is provided an illumination apparatus for an optical instrument, comprising illumination means for outputting illumination light;
  a lens molded out of rubber and arranged on an optical path for introducing the illumination light to a sample, output from the illumination means; and
  an enlargement lens for forming an enlarged image of the sample.

According to the second aspect of the present invention, there is provided an illumination apparatus for an optical instrument of the first aspect, further comprising
  a holder for holding the lens, and
  wherein the lens comprises, outside an effective light beam, a shock-absorbing portion for reducing distortion caused upon holding the lens by the holder.

According to the third aspect of the present invention, there is provided an illumination apparatus for an optical instrument of the first aspect, wherein the rubber comprises one material selected from the group consisting of silicone rubber, acrylic rubber, ethylene propylene rubber, isoprene rubber, fluororubber, butadiene rubber, a polystyrene-based thermoplastic elastomer, a polyurethane-based thermoplastic elastomer, a 1,2-polybutadiene-based thermoplastic elastomer, a chlorinated polystyrene-based thermoplastic elastomer, liquid polyisoprene, and liquid polybutadiene.

According to the fourth aspect of the present invention, there is provided an illumination apparatus for an optical instrument of the first aspect, wherein the rubber comprises a mixture of at least two materials selected from the group consisting of silicone rubber, acrylic rubber, ethylene propylene rubber, isoprene rubber, fluororubber, butadiene rubber, a polystyrene-based thermoplastic elastomer, a polyurethane-based thermoplastic elastomer, a 1,2-polybutadiene-based thermoplastic elastomer, a chlorinated polystyrene-based thermoplastic elastomer, liquid polyisoprene, and liquid polybutadiene.

According to the fifth aspect of the present invention, there is provided an illumination apparatus for an optical instrument of the first aspect, wherein the lens is one of a plurality of lenses provided on the optical path, and the lens is arranged at a position nearest to the illumination means of the plurality of lenses.

According to the sixth aspect of the present invention, there is provided an illumination apparatus for an optical instrument of the first aspect, wherein the lens is one of a plurality of lenses provided on the optical path, and the lens is arranged at a position second nearest to the illumination means of the plurality of lenses.

According to the seventh aspect of the present invention, there is provided an illumination apparatus for an optical instrument, comprising
  illumination means for outputting illumination light for fluorescent excitation;
  a first lens made of glass and arranged on an optical path for introducing the illumination light output from the illumination means to a sample;
  a second lens molded out of rubber and arranged on the optical path of the illumination light having passed through the first lens; and
  an objective lens for enlarging the sample.

According to the eighth aspect of the present invention, there is provided an illumination apparatus for an optical instrument of the seventh aspect, further comprising
  a holder for holding the second lens, and
  wherein the second lens comprises, outside an effective light beam, a shock-absorbing portion for reducing distortion caused upon holding the second lens by the holder.

According to the ninth aspect of the present invention, there is provided an illumination apparatus for an optical instrument of the seventh aspect, wherein the rubber comprises one material selected from the group consisting of silicone rubber, acrylic rubber, ethylene propylene rubber, isoprene rubber, fluororubber, butadiene rubber, a polystyrene-based thermoplastic elastomer, a polyurethane-based thermoplastic elastomer, a 1,2-polybutadiene-based thermoplastic elastomer, a chlorinated polystyrene-based thermoplastic elastomer, liquid polyisoprene, and liquid polybutadiene.

According to the 10th aspect of the present invention, there is provided an illumination apparatus for an optical instrument of the seventh aspect, wherein the rubber comprises a mixture of at least two materials selected from the group consisting of silicone rubber, acrylic rubber, ethylene propylene rubber, isoprene rubber, fluororubber, butadiene rubber, a polystyrene-based thermoplastic elastomer, a polyurethane-based thermoplastic elastomer, a 1,2-polybutadiene-based thermoplastic elastomer, a chlorinated polystyrene-based thermoplastic elastomer, liquid polyisoprene, and liquid polybutadiene.

According to the 11th aspect of the present invention, there is provided an optical microscope comprising a light source lamp for emitting illumination light;

a holder for holding the light source lamp;

a lens held by the holder and molded out of rubber;

a first flat glass plate arranged between the lens and the light source lamp; and a second flat glass plate arranged between the lens and a sample to be observed, wherein the lens is sealed by the first flat glass plate, the second flat glass plate, and the holder.

According to the 12th aspect of the present invention, there is provided an optical microscope of the 11th aspect, wherein the first flat glass plate is a flat frosted glass plate.

According to the 13th aspect of the present invention, there is provided an optical microscope of the 11th aspect, wherein the lens has an aspherical shape on a second flat glass plate side.

According to the 14th aspect of the present invention, there is provided an optical microscope of the 11th aspect, wherein the flat frosted glass plate has a frosted surface on a lens side.

According to the 15th aspect of the present invention, there is provided an optical microscope of the 11th aspect, wherein the lens comprises, outside an effective light beam, a shock-absorbing portion for reducing distortion caused upon holding the lens by the holder.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinbefore.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments give below, serve to explain the principles of the invention.

DETAILED DESCRIPTION OF THE INVENTION

Embodiments of the present invention will be generally described.

<General Description>

An optical lens used in an illumination apparatus for an optical instrument according to the present invention is a transparent rubber elastic member.

The material used for the transparent rubber elastic member includes, e.g., silicone rubber, acrylic rubber, ethylene propylene rubber, isoprene rubber, fluororubber, butadiene rubber, a polystyrene-based thermoplastic elastomer, a polyurethane-based thermoplastic elastomer, a 1,2-polybutadiene-based thermoplastic elastomer, a chlorinated polystyrene-based thermoplastic elastomer, liquid polyisoprene, liquid polybutadiene, and a mixture of two or more materials selected from them.

The elastic member is simply made of rubber or silicone rubber in the following embodiments, but any of the above rubber materials can be used.

The transparent rubber elastic member is obtained by adding no additive impairing the original transparency to the above material or decreasing the content of the additive.

The characteristics of a transparent silicone rubber elastic member will be explained. The use temperature of this transparent rubber elastic member is 200°C. or more (maximum: about 230°C.). As for a general plastic, the use temperature of polycarbonate is about 120° C., and that of another plastic (e.g., acrylic plastic) is about 100° C. or less. The linear expansion coefficient of this transparent rubber is about four to five times the linear expansion coefficient of polycarbonate, acrylic plastic, or the like.

The transmittance of the transparent rubber elastic member decreases from an ultraviolet wavelength of about 340 nm. However, the transparent rubber elastic member can transmit about 50% of light even with an ultraviolet wavelength of about 250 nm, similarly to quartz and fluorite lenses. To the contrary, a general plastic lens can transmit only light with a wavelength up to about 400 nm for polycarbonate and about 380 nm for acrylic plastic.

Embodiments of the present invention will be described below with reference to several views of the accompanying drawing.

<First Embodiment>

Figure 1:
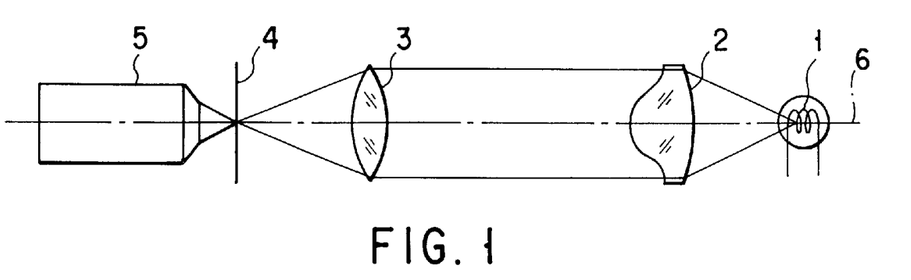
FIG. 1 is a view showing an optical illumination system for an optical microscope according to the first embodiment of the present invention.

FIG. 1 is a view showing an optical illumination system for an optical microscope according to the first embodiment of the present invention.

In FIG. 1, reference numeral 1 denotes a light source lamp; 2, a collector lens for collimating light from the light source lamp 1 into an almost parallel light beam; 3, a condenser lens arranged on substantially the same axis as the light source lamp 1 and the collector lens 2 to focus the illumination light beam via the collector lens 2 on a sample 4; 5, an objective lens for sample observation; and 6, an optical axis of the objective lens 5, on which the condenser lens 3, the collector lens 2, and the light source lamp 1 are aligned.

The collector lens 2 and the condenser lens 3 are formed from lenses molded out of a silicone rubber material. The silicone rubber has such a transmittance as to transmit even light with a wavelength in the ultraviolet range, e.g., a wavelength of 200 nm or less, resists heat at 200°C. or more, and can be easily molded.

In the optical microscope of the first embodiment, light emitted by the light source lamp 1 is collimated into a parallel light beam by the collector lens 2. The light beam via the collector lens 2 is focused on the sample 4 by the condenser lens 3 to illuminate the sample 4. The sample 4 is observed via the objective lens 5.

At this time, of light with various wavelengths emitted by the light source lamp 1, light with a wavelength in the ultraviolet range, e.g., a wavelength of, e.g., 200 nm or less also is transmitted through the collector lens 2 and the condenser lens 3 to illuminate the sample 4.

According to the optical microscope of the first embodiment, the collector lens 2 and the condenser lens 3 arranged near the light source lamp 1 do not thermally deform in comparison with a conventional lens made of a plastic, quartz, or the like because they can resist heat at 200° C. or more. The collector lens 2 and the condenser lens 3 have high ultraviolet transmittances and can be easily molded, so that an illumination system can be realized at low manufacturing cost.

Figure 2:
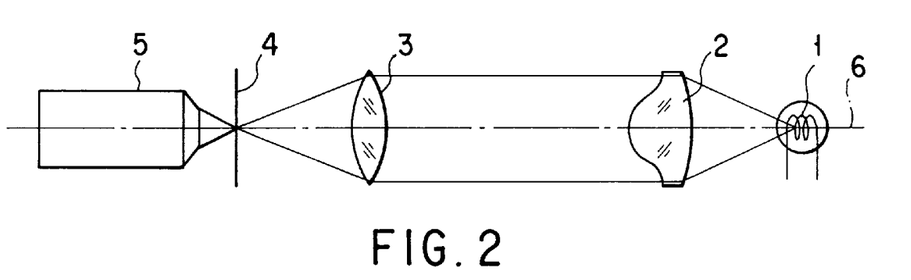
FIG. 2 is a view showing a modification of the optical illumination system for the optical microscope according to the first embodiment of the present invention.

FIG. 2 is a view showing a modification of the optical illumination system for the optical microscope according to the first embodiment of the present invention.

The arrangement is the same as in FIG. 1 except that the collector lens 2 is formed from a lens molded out of a silicone rubber material, and the condenser lens 3 is made of a glass or plastic material different from the material for the condenser lens 3 in FIG. 1.

In this modification, the collector lens 2 can resist heat at 200° C. or more. Even if the collector lens 2 is arranged near the light source lamp 1, problems such as thermal deformation and thermal coloring (yellowing) scarcely occur, compared to the collector lens 2 using a lens made of a plastic.

By using a low-dispersed glass as a material for the condenser lens 3, the condenser lens 3 can also transmit ultraviolet light at about 360 nm to illuminate the sample 4 with the ultraviolet light from the light source lamp 1 via the collector lens 2 and the condenser lens 3. In addition, an illumination optical system can be provided at low manufacturing cost by molding of silicone rubber.

Figure 3:
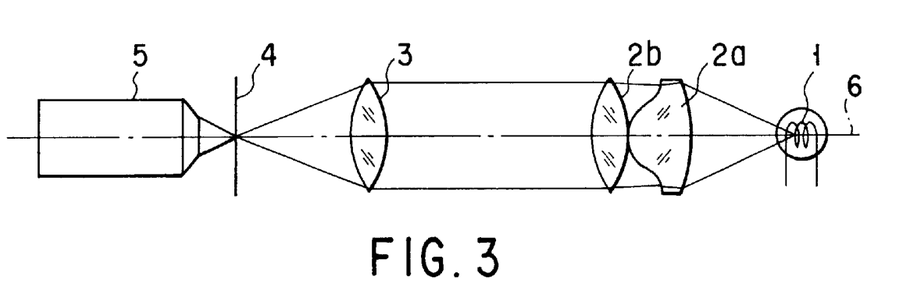
FIG. 3 is a view showing another modification of the optical illumination system for the optical microscope according to the first embodiment of the present invention.

FIG. 3 is a view showing another modification of the optical illumination system for the optical microscope according to the first embodiment of the present invention.

The optical illumination system of this modification is different from the optical illumination system in FIG. 1 in that the collector lens 2 is made up of two collector lenses 2a and 2b, and the collector lens 2a is formed from a lens molded out of a silicone rubber material.

In this modification, the collector lens 2a near the light source lamp 1 can resist heat at 200° C. or more. Even if the collector lens 2a is arranged near the light source lamp 1, problems such as thermal deformation and thermal coloring (yellowing) hardly occur, compared to the collector lens 2 using a lens made of a plastic.

By using a low-dispersed glass as a material for the collector lens 2b and the condenser lens 3, the collector lens 2b and the condenser lens 3 can also transmit ultraviolet light at about 365 nm to illuminate the sample 4 with the ultraviolet light from the light source lamp 1 via the collector lenses 2a and 2b and the condenser lens 3. Further, an illumination optical system can be provided at low manufacturing cost by molding of silicone rubber.

In the optical microscope according to the first embodiment of the present invention, at least one lens arranged near the light source lamp 1 is a lens molded out of a silicone rubber material. If the sample need not be illuminated with ultraviolet light, lenses except for the one arranged near the light source lamp 1 can be made of a plastic material and hardly thermally deform.

Note that the present invention is not limited to the illumination system according to the above-described embodiment, and can be applied to an observation system for the optical microscope in consideration of necessary functions and performance.

According to the first embodiment, a low-cost optical microscope can be provided by forming it with a lens molded out of particularly a silicone rubber material.

<Second Embodiment>

Figure 4:
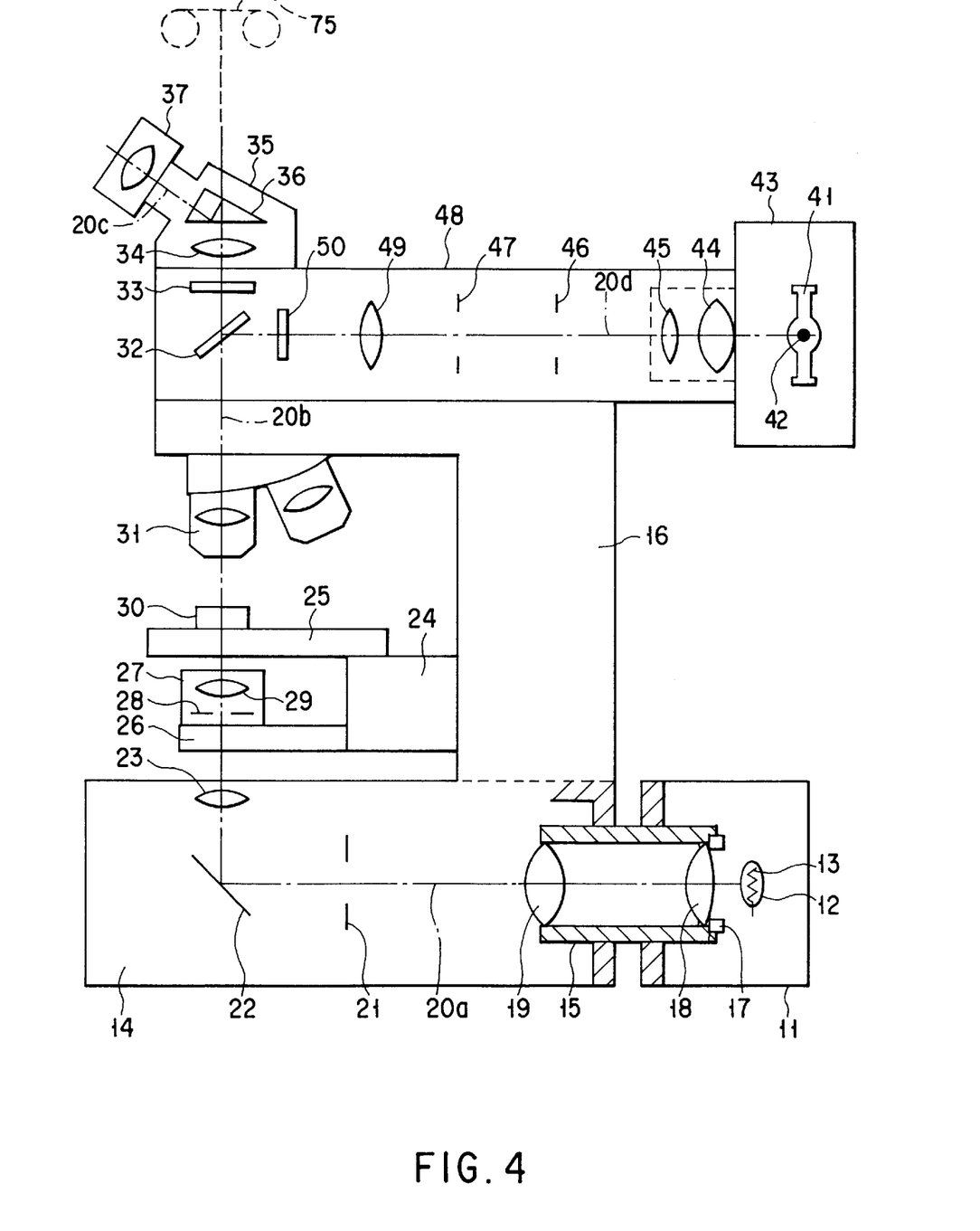
FIG. 4 is a view showing an optical microscope according to the second embodiment of the present invention.

FIG. 4 is a view showing an optical microscope according to the second embodiment of the present invention.

An optical transmission/illumination system will be first described.

As shown in FIG. 4, a lamp 12 such as a halogen lamp is incorporated in a lamp housing 11. Reference numeral 13 denotes a filament of the lamp 12.

The lamp housing 11 and a base 14 of a frame 16 are coupled by a lens frame 15. A collector lens 18 is held by a press ring 17 at one end of the lens frame 15 on the lamp 12 side. The collector lens 18 and part of the lens frame 15 are fitted and positioned so that the diameter of the collector lens 18 is set equal to the inner diameter of part of the lens frame 15. Threaded portions are formed in the lens frame 15 and the press ring 17, and the collector lens 18 is held at these threaded portions.

A collector lens 19 formed from a lens molded out of a silicone rubber material is arranged at the other end of the lens frame 15. The collector lens 19 is fixed by its flange to the lens frame 15.

Illumination light from the lamp 12 is collimated into parallel light via the collector lenses 18 and 19. A mirror 22 for reflecting illumination light having passed through a field stop (FS) 21 in a direction perpendicular to an optical axis (horizontal optical axis for transmission illumination) 20a for the parallel light, i.e., in the direction of an optical axis 20b is arranged on the horizontal optical axis 20a for the transmission illumination.

The illumination light reflected by the mirror 22 passes through a window lens 23, an aperture stop 28 and condenser lens 29 of a condenser 27 mounted on a condenser support 26, a sample 30 placed on a stage 25, an objective lens 31 for enlarging the image of the sample, a dichroic mirror 32, and an absorption filter 33 for absorbing a specific wavelength component. A stage support 24 is vertically movable with respect to the frame 16.

The parallel light via the objective lens 31 which has passed through the absorption filter 33 is formed into an image by an imaging lens 34 within a lens barrel 35 and deflected by a prism 36. The deflected illumination light is guided to an eyepiece lens 37 arranged on an observation optical axis 20C of the illumination light. In normal transmission illumination, the dichroic mirror 32 and the absorption filter are removed from the optical axis 20b.

In this optical transmission/illumination system, light emitted by the filament of the halogen lamp is collimated into parallel light via the two collector lenses 18 and 19. The parallel light is focused by the window lens 23. A filament image is projected on the position of the aperture stop 28 and collimated into parallel light by the condenser lens 29 to illuminate the sample. That is, this optical transmission/illumination system adopts Köhler illumination.

As described above, the two collector lenses 18 and 19 are fixed to the collector lens frame 15. The lens frame 15 couples the lamp housing 11 to the base 14.

The collector lens (CL1) 18 near the light source lamp 12 is fixed by the press ring 17 to the lens frame 15. The collector lens (CL2) 19 is made of silicone rubber and fixed by its flange to the lens frame 15.

For example, when the power of the lamp 12 is equal to or more than 100 W, the collector lens (CL1) 18 may be heated to more than 200°C., which exceeds the resistant temperature of a silicone rubber lens.

Even in this case, since the collector lens (CL1) 18 is made of a glass, heat transmitted to the collector lens (CL2) 19 is mainly heat transmitted through the lens frame 15 and decreases to 100° C. or less.

In this manner, since the collector lens (CL1) 18 near the light source lamp 12 is made of a glass, and the collector lens (CL2) 19 via the lens frame 15 is made of silicone rubber, the optical transmission/illumination system arranged near the light source lamp scarcely thermally deforms. The collector lens 19 can be easily molded, so that an illumination apparatus can be provided at low manufacturing cost.

When a photographic device 75 is arranged on the optical axis 20b, a photograph taken by the photographic device can ensure satisfactory color reproduction (obtain appropriate colors) without any thermal discoloration and coloring because the silicone rubber lens resists heat. It is the same with a change in observation image color.

An incident fluorescence optical illumination system will be explained.

The incident fluorescence optical illumination system also employs Kohler illumination. More specifically, illumination light emitted by an arc 42 of a mercury-vapor lamp 41 incorporated in a lamp housing 43 is formed into an image near an aperture stop 46 by two collector lenses 44 and 45 within a projection tube 48.

The formed image is focused near the pupil of the objective lens 31 by a projection lens 49. The focused illumination light is collimated into parallel light by the objective lens 31 to illuminate the sample 30. Reference numeral 20d denotes a horizontal optical axis for incident illumination as the optical axis of the respective optical elements such as the collector lenses 44 and 45 arranged during deflection between the mercury-vapor lamp 41 and the dichroic mirror 32. A field stop 47 allows to project a stop image on the sample 30 via the projection lens 49 and the objective lens 31. The illumination range can be changed by changing the stop aperture.

An excitation filter 50 and the dichroic mirror 32 between the projection lens 49 and the objective lens 31 are flat parallel plates and do not contribute to imaging. In U-excitation for fluorescence observation, the sample is illuminated with 365-nm light via the excitation filter 50 and the dichroic mirror 32. Blue fluorescence with the shortest wavelength of a little less than 500 nm or more is guided from the sample to the eyepiece lens 37 by the dichroic mirror 32, the absorption filter 33, and the imaging lens 34, allowing the observer to observe this fluorescence.

In observing fluorescence, the sample must be illuminated with 365-nm light via the two collector lenses 44 and 45 and the projection lens 49. The lenses including the objective lens 31 must transmit the 365-nm light, so no plastic lens can be used. A silicone rubber lens can be used for the two collector lenses 44 and 45 and the projection lens 49.

The collector lens 44 near the arc 42 or the two collector lenses 44 and 45 are made from silicone rubber lenses.

Further, the projection lens 49 can also be made from a silicone rubber lens. Note that the lenses 45 and 49 except for the collector lens 44 near the arc 42 are desirably made from silicone rubber lenses. In U-excitation for fluorescence observation, the illumination wavelength is about 365 nm, and a conventional low-dispersed glass is used for the glass collector lens 44.

The temperature may greatly increase near the arc 42 of the mercury-vapor lamp 41, so that the collector lens 44 is desirably made from a glass lens. The lenses are fixed by the same mechanism as that of the optical transmission/illumination system.

The silicone rubber lens used for the collector lens and the projection lens need not be polished and is lighter than a special ultraviolet glass lens such as a quartz or fluorite lens, or a low-dispersed glass lens treated more easily than a quartz or fluorite lens. The silicone rubber lens transmits ultraviolet rays more than a plastic lens, and thus it is effective for an optical illumination system for U-excitation fluorescence observation with, e.g., 365-nm light.

Since the silicone rubber lens has a higher ultraviolet transmittance and can be more easily molded, compared to a conventional glass lens, an illumination system can be constituted at low manufacturing cost.

The collector lenses 44 and 45 may be arranged inside the projection tube 48. Alternatively, they may be arranged in the lamp housing 43, and the lamp housing 43 may be coupled to the projection tube 48.

Figure 5:
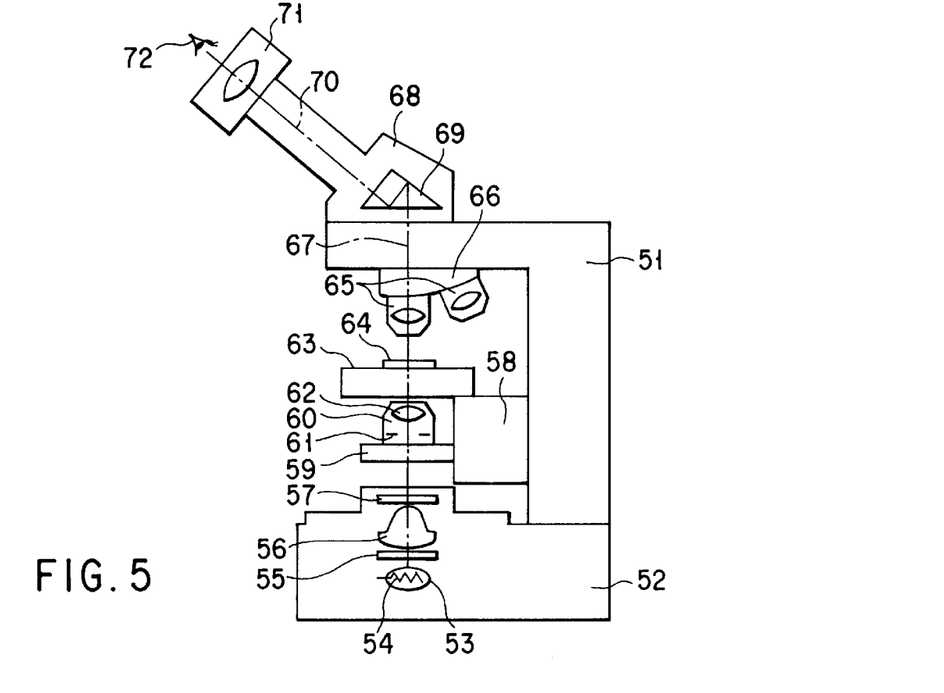
FIG. 5 is a view showing another optical microscope according to the second embodiment of the present invention.

FIG. 5 is a view showing another optical microscope according to the second embodiment of the present invention.

A lamp 53 is incorporated in a base 52 of a frame 51. A flat frosted glass plate 55, a collector lens 56 made of silicone rubber, and a flat glass plate 57 are arranged on the optical path of illumination light emitted by a filament 54 of the lamp 53.

A condenser support 59 is attached to a stage support 58 vertically movable with respect to the frame 51. The condenser support 59 is vertically movable with respect to the stage support 58, and a condenser 60 is arranged on the condenser support 59.

The condenser 60 has an aperture stop 61 and a condenser lens 62. Illumination light having passed through the condenser lens 62 passes through a sample 64 placed on a stage 63 and an objective lens 65 attached to a revolver 66, and then deflected by a prism 69 in a lens barrel 68. An optical axis 67 is the optical axis of the collector lens 56, the condenser lens 62, and the objective lens 65.

The illumination light deflected by the prism 69 is observed by an observer's eye 72 via an eyepiece lens 71 set on an observation optical axis 70.

In the optical illumination system for the optical microscope according to the second embodiment, illumination light emitted by the lamp 53 is focused by the collector lens 56, and the image of the filament 54 of the lamp 53 is formed near the aperture stop 61.

The filament image is collimated into a parallel light beam and further a focused light beam by the condenser lens 62 to illuminate the sample 64. The image of the illuminated sample 64 is enlarged and observed via the objective lens 65, the lens barrel 68 including the prism 69, and the eyepiece lens 71. That is, the optical illumination system for the optical microscope according to the second embodiment is simple Köhler illumination.

Instead of Köhler illumination, critical illumination may be employed in which a filament image is collimated into a parallel light beam by the collector lens 56, and the focused light beam and the filament image are focused by the condenser lens 62.

Figure 6:
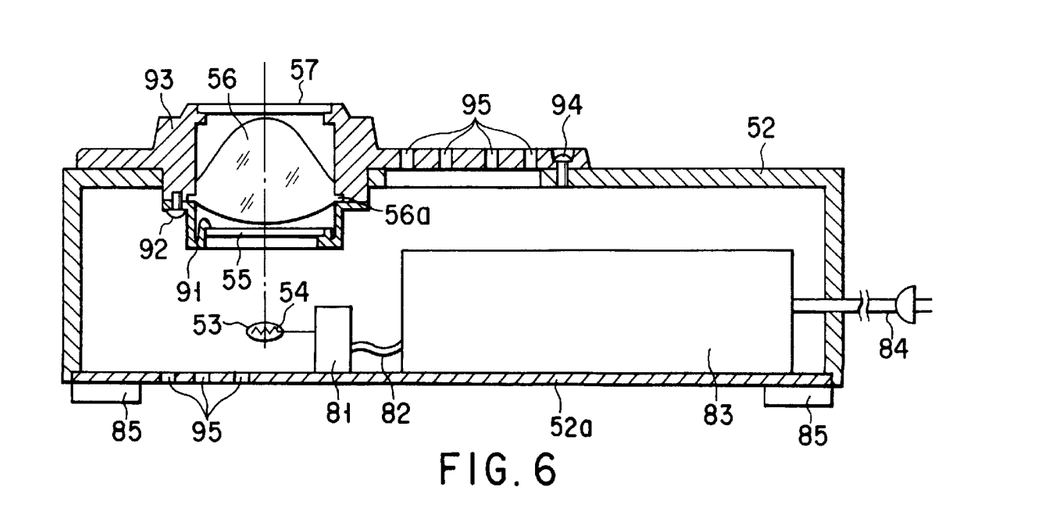
FIG. 6 is a view showing the base of the optical microscope according to the second embodiment.

FIG. 6 is a view showing the internal arrangement of the base.

Note that the same reference numerals as in FIG. 5 denote the same parts.

As shown in FIG. 6, the lamp 53 is held by a bottom plate 52a formed integrally with the base 52 with a screw (not shown), and a lamp socket 81 attached to the bottom plate 52a. The lamp socket 81 is connected to a power supply 83 via a cord 82. The power supply 83 is designed to convert a commercial voltage supplied via a power cord 84 into a lamp use voltage. Openings 95 for dissipating heat are formed in the top and bottom surfaces of the base 52. Rubber legs 85 are attached to the bottom surface of the base 52.

The filament 54 of the lamp 53 has a collapsed coil shape, which is not ideally flat due to the depth and the gap of the coil. The flat frosted glass plate 55 is arranged to almost uniformly illuminate the sample surface.

The flat frosted glass plate 55 is fixed to a frame 91 with a frosted surface facing the collector lens 56. The frame 91 is fixed to a lens frame 93 with a screw 92.

The collector lens 56 is made of silicone rubber, and is spherical on the lamp 53 side and aspherical on the sample side. The collector lens 56 has a flange 56a at a portion larger than the diameter of an effective light beam (see FIG. 9).

The collector lens 56 is fixed by sandwiching the flange 56a between the lens frame 93 and the frame 91. The aspherical surface of the collector lens 56 has a cylindrical section. By adjusting the cylindrical section to the inner diameter of the lens frame 93, the collector lens 56 is positioned with respect to the optical axis.

The collector lens 56 is sealed by the flat frosted glass plate 55 and the flat glass plate 57 in order to prevent dust from accumulating near the lens frame around the collector lens 56 because dust accumulated at this portion is difficult to clean.

If the collector lens 56 arranged immediately above the lamp 53 is made of a rubber, the lens itself thermally expands, and the refractive index of the lens slightly changes. For this reason, the Köhler illumination described above is effective because no image is directly formed on the sample surface. Critical illumination can also be applied as far as the temperature hardly rises.

The collector lens 56 is made of a rubber. If the collector lens 56 is shaped to be spherical on the lamp side and aspherical on the sample side, a low-cost lens with small spherical aberration can be realized.

Figure 7:
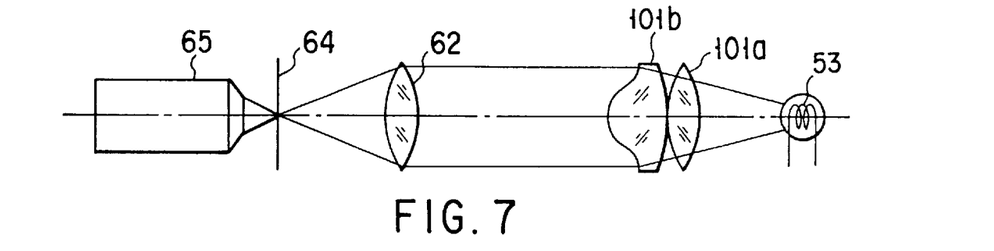
FIG. 7 is a view showing a modification of the collector lens of the optical microscope according to the second embodiment.

For a high refractive index, a spherical collector lens 101a made of silicone rubber and a second collector lens 101b made of silicone rubber and having spherical and aspherical surfaces may be respectively used as the first and second lenses on the lamp 53 side, as shown in FIG. 7.

Figure 8:
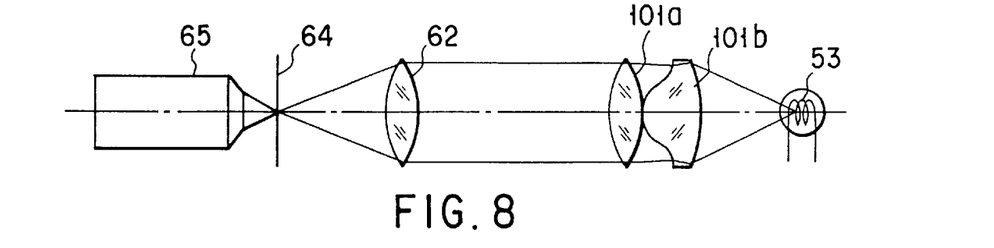
FIG. 8 is a view showing another modification of the collector lens of the optical microscope according to the second embodiment.

When an output from the lamp 53 is large, the first lens 101a is desirably made of glass. The positions of the lenses 101a and 101b may be changed to each other, as shown in FIG. 8.

Figure 9:
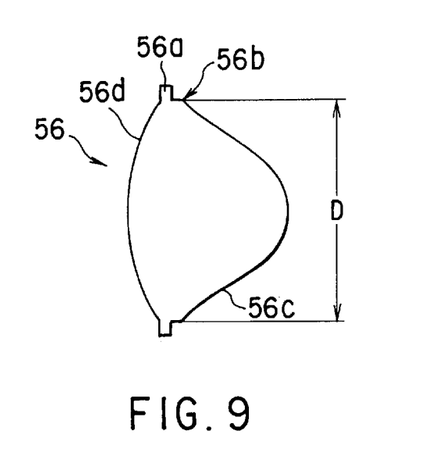
FIG. 9 is a view showing the collector lens of the optical microscope according to the second embodiment.

FIG. 9 is a view showing the collector lens shown in FIG. 6.

In FIG. 9, reference numeral 56a denotes a flange; 56b, a core diameter portion (size D portion in FIG. 9) where the core projects with respect to the optical axis of the lens; 56c, an aspherical portion of the collector lens; and 56d, a spherical portion.

In the collector lens 56, the core diameter is about 40 mm, the distance (on the optical axis) between the top of the aspherical portion 56c and the top of the spherical portion 56d is about 30 mm, and the diameter and thickness of the flange 56a are 50 mm and about 2 mm, respectively.

The assembly of the collector lens in the optical instrument is shown in FIG. 6. A method of fixing the collector lens 56 will be explained.

By adjusting the core diameter portion 56b where the core projects with respect to the optical axis, to the inner diameter of the lens frame, the center of the lens frame coincides with the optical axis of the lens. The collector lens 56 is positioned at either one of the surfaces of the flange 56a with respect to the filament of the light source lamp along the optical axis, another lens, and the like.

The lens is held by the thin flange 56a and fixed at a portion with about 7% or 10% or less of lens thickness from the above data. The flange 56a plays an important role in fixing the lens.

By making the flange 56a thin, the lens can be fixed without impairing the shapes of the aspherical portion 56c and spherical portion 56d, i.e., the performance necessary for the lens. If a rubber lens without any thin flange 56a made up of the aspherical portion 56c, the spherical portion 56d, and the core diameter portion 56b is forcibly fixed by a press ring or the like, the aspherical or spherical portion or the lens interior may be distorted, and desired lens performance may be degraded.

The thin flange 56a can be expressed as a fixing force absorbing portion. Since this fixing force absorbing portion can be formed integrally with the rubber lens itself, the flange 56a can be easily molded, and an illumination system can be constituted at low manufacturing cost.

Figure 10:
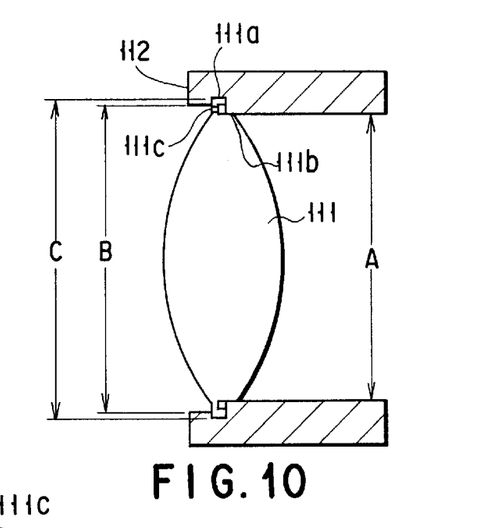
FIG. 10 is a view showing a modification of a rubber lens with a fixing force absorbing portion.
Figure 11:
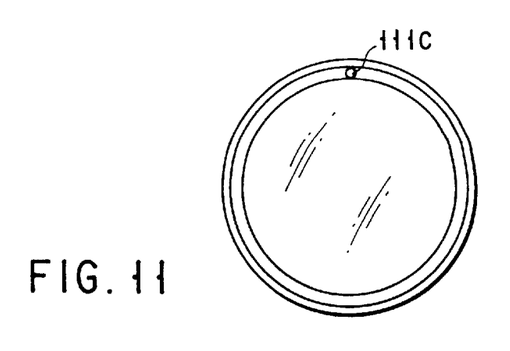
FIG. 11 is a front view of the lens shown in FIG. 10.

FIG. 10 is a view showing a modification of the rubber lens with the fixing force absorbing portion. FIG. 11 is a front view of the lens shown in FIG. 10.

As shown in FIG. 10, a lens 111 is held by a lens holder 112 at a flange 111a of the lens 111. The flange 111a is made up of a thick collar and a thin collar.

The lens core is adjusted by a core diameter portion 111b of the lens 111 and an inner diameter A of the lens holder. The flange 111a is deformed along the optical axis of the lens to pass through an inner diameter B. The thick collar of the flange is fitted using the elasticity of the rubber in a groove with an inner diameter C which is formed in the lens holder 112.

A fixing force acts on the thick collar, but no fixing force acts on the two spherical surfaces of the lens 111 via the thin collar. The thin collar of the flange can be called a fixing force absorbing portion.

A hole 111c is formed in the flange 111a. The hole 11c allows a bar-like removal jig or the like to insert therein in removing the lens 111 in order to repair the lens 111.

Figure 12:
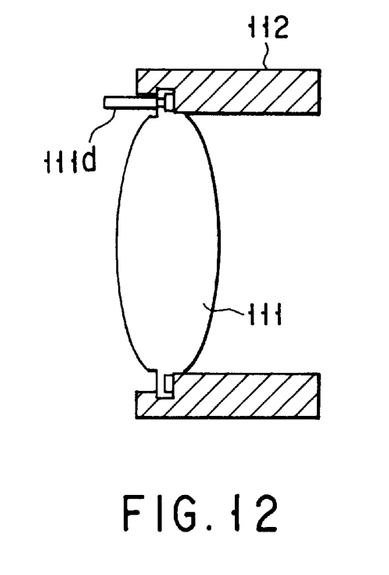
FIG. 12 is a view showing another modification of the rubber lens with the fixing force absorbing portion.

Instead of forming the hole 111c in the flange 111a, a projection 111d may be formed, as shown in FIG. 12.

Forming the hole 111c and the projection 111d facilitates removal of the lens 111 from the lens holder 112 in repairing the lens 111 and the lens holder 112, resulting in good repairability.

Figure 13:
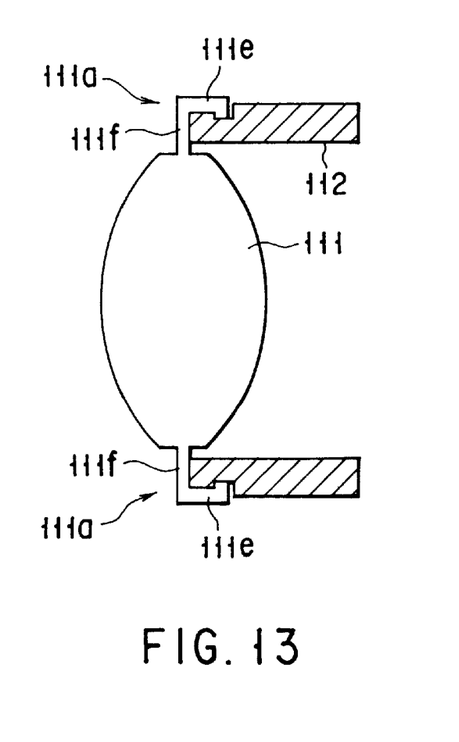
FIG. 13 is a view showing still another modification of the rubber lens with the fixing force absorbing portion.

FIG. 13 is a view showing another modification of the rubber lens with the fixing force absorbing portion.

Figure 14:
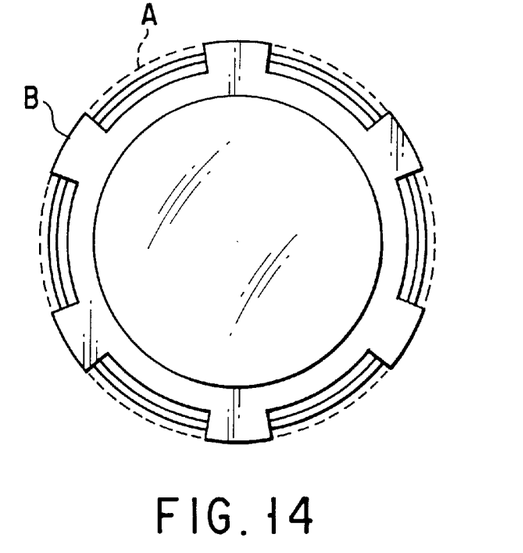
FIG. 14 is a front view of the lens and a lens holder shown in FIG. 13.

FIG. 14 is a front view of the lens and the lens holder shown in FIG. 13.

In FIG. 10, the lens 111 is held by fitting the flange 111a of the lens 111 in the lens holder 112. In this modification, the flange 111a of the lens 111 has a thin collar 111f and a thick collar 111e attached to be substantially perpendicular to the thin collar 111f, as shown in FIG. 13.

A groove for fitting the thick collar 111e therein is formed in the outer circumference of the lens holder 112. The core of the lens 111 is fixed by fitting the thick collar 111e in the groove formed in the outer circumference of the lens holder 112 by using the elasticity of the rubber. In other words, the thick collar 111e and thin collar 111f of the lens 111 hold the lens 111 so as to embrace the lens holder 112.

By fixing the lens 111 in this manner, no fixing force acts on the two spherical surfaces of the lens 111 via the thin collar 111f though a fixing force acts on the thick collar 111e.

The flange 111a having the thick collar 111e and the thin collar 111f may be formed on the entire peripheral portion of the lens 111, as indicated by the dotted line A in FIG. 14, or partially on the peripheral portion, as indicated by the solid line B.

Since the flange 111a can be removed by a jig or the like in repair, the fixing of the lens 111 can be easily canceled. Since the flange 111a can be formed integrally with the lens 111, the lens 111 can be manufactured at low cost, and as a result a low-cost optical illumination system can be provided.

Figure 15:
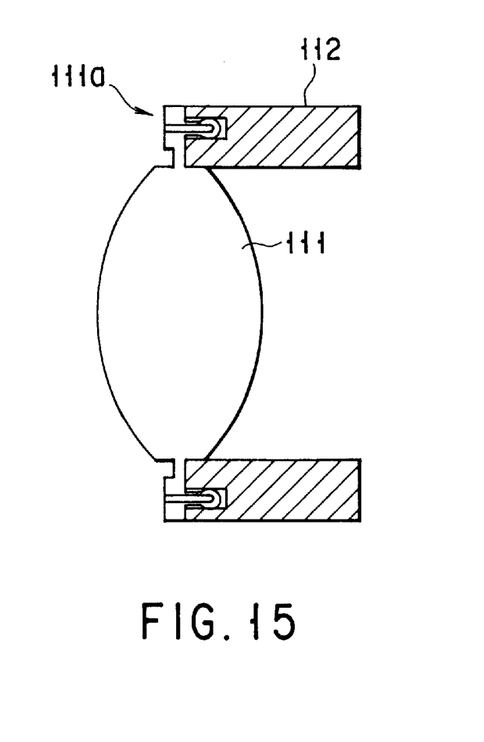
FIG. 15 is a view showing still another modification of the rubber lens with the fixing force absorbing portion.
Figure 16:
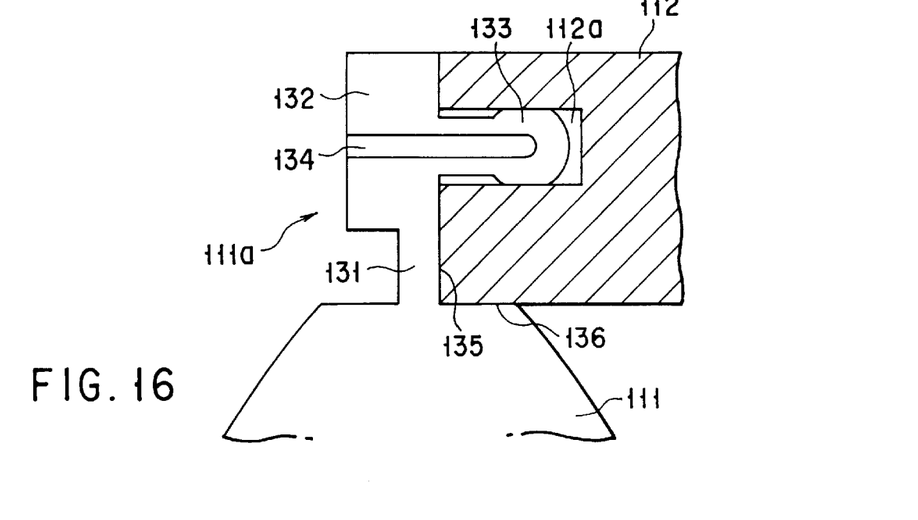
FIG. 16 is a view showing a lens attaching portion in detail.
Figures 17, 18:
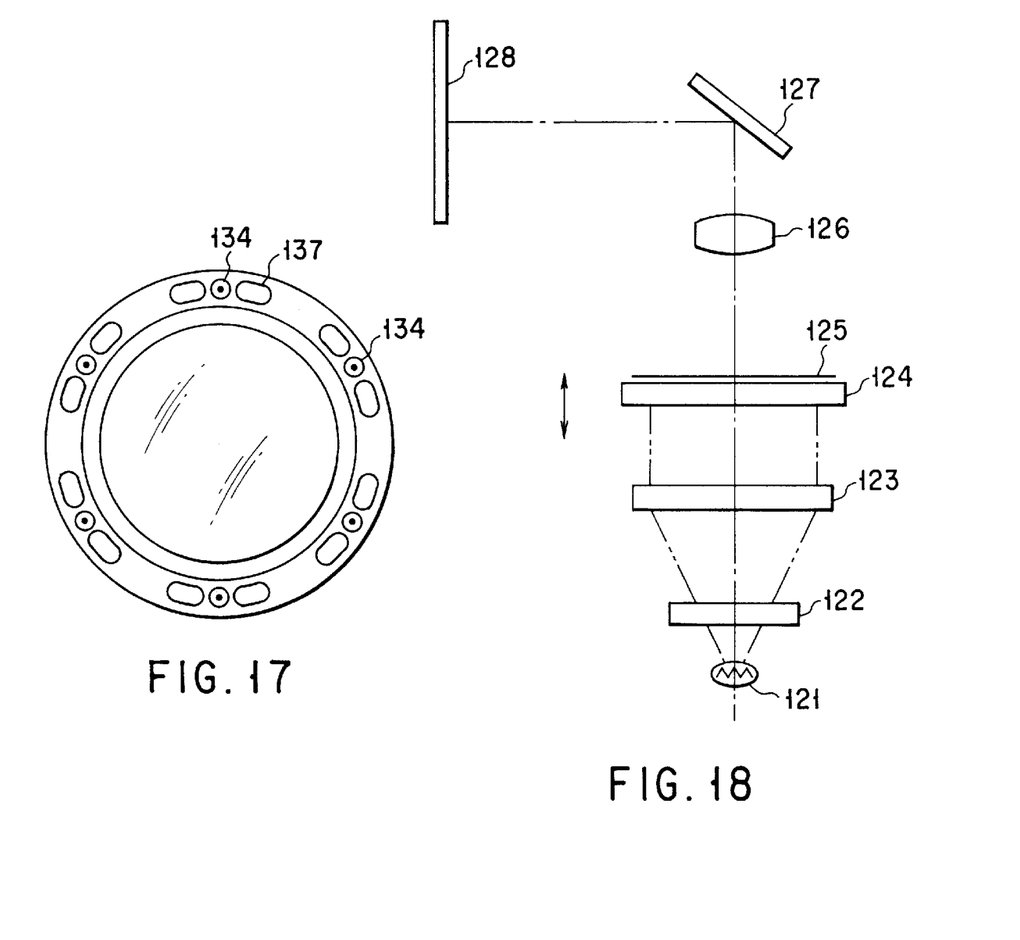
FIG. 17 is a front view of the lens and the lens holder shown in FIG. 15.
FIG. 18 is a view showing an optical illumination system for a projector according to the third embodiment of the present invention.

FIG. 15 is a view showing still another modification of the rubber lens with the fixing force absorbing portion. FIG. 16 is a view showing a lens attaching portion in detail. FIG. 17 is a front view of the lens and the lens holder shown in FIG. 15.

As shown in FIG. 16, the flange 111a of the lens 111 has a thin collar 131 and a thick collar 132. The lens 111 is positioned by an abutment surface 135 of the lens 111 along the optical axis and by a diameter portion 136 in a direction perpendicular to the optical axis.

The thick collar 132 has a projection 133 with a spherical distal end, as shown in FIG. 16. In the collar 132, a hole 134 extending to the projection 133 is formed.

To fix the lens 111, the projection 133 is fitted using the elasticity of the rubber in a hole 112a formed in the lens holder 112. A bar-like fixing jig is inserted in the hole 134 formed in the projection 133 to fix the lens 111 to the lens holder 112.

In this lens 111, a fixing force acts on the thick collar 132, but no fixing force acts on the two spherical surfaces of the lens 111 via the thin collar 131.

As shown in FIG. 17, the flange 111a has elongated openings 137 circumferentially formed on the two sides of each of the holes 134 formed in the collar 132. The opening 137 is used to remove the lens 111 in repair or the like.

That is, a bar-like removal jig is inserted in the opening 137, and the lens 111 is removed from the lens holder 112. Note that the fixing jig may be used as the removal jig.

Since the fixing force absorbing portion can be formed integrally with the lens 111 of this modification, an optical illumination system for an optical microscope can be provided at low manufacturing cost.

In the second embodiment, the lens 111 is held by the lens holder. The collector lens 18 (and 19), the collector lenses 44 and 45, and the projection lens 49 in the second embodiment, and the condenser lens 3 and the like in the remaining embodiments can also be held in a similar manner.

<Third Embodiment>

FIG. 18 is a view showing an optical illumination system for a projector according to the third embodiment of the present invention.

Illumination light emitted by a lamp 121 is diverged by a diffusion lens such as a concave lens. As the diffusion lens, a Fresnel lens 122 formed from a lens molded out of a silicone rubber material is used.

The illumination light diffused by the Fresnel lens 122 is collimated into parallel light by a condenser lens 123 such as a convex lens to illuminate a sample 125 (transparent sheet with characters and the like written with, e.g., a pen) placed on a flat glass plate 124.

The illumination light having passed through the sample 125 is spread by a projection lens 126, reflected by a mirror 127, and then projected on a screen 128. The image of the sample 125 on the screen 128 is focused by moving the flat glass plate 124 having the sample 125 along the arrow shown in FIG. 18 with respect to the projection lens 126.

The third embodiment has exemplified the Flesnel lens as a diffusion lens, but the diffusion lens may be a spherical lens.

According to the third embodiment, since the rubber Flesnel lens 122 can be easily processed, a low-cost illumination apparatus can be provided. The rubber Flesnel lens arranged near the light source 121 does not thermally deform.

As has been described in detail above, according to the present invention, a low-cost illumination apparatus for an optical instrument can be provided. In addition, an illumination apparatus for an optical instrument in which an optical element can be easily fixed can be provided.

Additional advantages and modifications will readily occurs to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

We claim:

1. An optical microscope comprising:

a light source lamp for emitting illumination light;

a holder for holding said light source lamp;

a lens held by said holder; the lens being molded out of rubber;

a first flat glass plate arranged between said lens and said light source lamp; and a second flat glass plate arranged between said lens and a sample to be observed, wherein said lens is sealed by said first flat glass plate, said second flat glass plate, and said holder.

2. A microscope according to claim 1, wherein said first flat glass plate is a flat frosted glass plate.

3. A microscope according to claim 1, wherein said lens has an aspherical shape on a second flat glass plate side.

4. A microscope according to claim 1, wherein said flat frosted glass plate has a frosted surface on a lens side.

5. A microscope according to claim 1, wherein said lens comprises, outside an effective light beam, a shock-absorbing portion for reducing distortion caused upon holding said lens by said holder.

6. An illumination apparatus for an optical instrument, comprising:
an illumination section for providing illumination light;
a lens molded out of rubber, the lens being arranged in an optical path for introducing the illumination light provided by the illumination section to a sample; and
a holding member having a recess for insertion of the lens,
wherein the lens includes a core diameter portion outside an effective light beam and at least one thin flange section which is provided on an outer region of the core diameter portion, the core diameter portion including a lens core which corresponds to an optical axis of the lens, the holding member being provided such that an axis of the recess corresponds to an axis of the illumination light and including a fixing section for fixing the at least one thin flange section in a state where the core diameter portion is inserted into the recess of the holding member.

7. An illumination apparatus according to claim 6, wherein the fixing section has a frame for engaging the at least one thin flange section.

8. An illumination apparatus according to claim 6, wherein the fixing section hooks at least part of the at least one thin flange section.

9. An illumination apparatus according to claim 6, wherein the at least one thin flange section has a hole for inserting a jig which allows the lens to be inserted into or removed from the recess of the holding member.

10. An illumination apparatus according to claim 6, wherein the at least one thin flange section has a projection for inserting the lens into the recess of the holding member and for removing the lens from the recess of the holding member.

11. An illumination apparatus according to claim 6, further comprising an objective lens for forming an enlarged image of the sample.

12. An illumination apparatus according to claim 6, wherein the optical instrument is a microscope and at least one surface of the lens is aspheric.

13. An illumination apparatus according to claim 6, wherein the optical instrument is a microscope, at least one surface of the lens is aspheric and the fixing section hooks at least a portion of the at least one thin flange section.

14. An illumination apparatus according to claim 6, wherein the rubber comprises a material selected from the group consisting of silicone rubber, acrylic rubber, ethylene propylene rubber, isoprene rubber, fluororubber, butadiene rubber, a polystyrene-based thermoplastic elastomer, a polyurethane-based thermoplastic elastomer, a 1,2-polybutadiene-based thermoplastic elastomer, a chlorinated polystyrene-based thermoplastic elastomer, liquid polyisoprene, and liquid polybutadiene.

15. An illumination apparatus according to claim 6, wherein the rubber comprises a mixture of at least two materials, which are different with each other, selected from the group consisting of silicone rubber, acrylic rubber, ethylene propylene rubber, isoprene rubber, fluororubber, butadiene rubber, a polystyrene-based thermoplastic elastomer, a polyurethane-based thermoplastic elastomer, a 1,2-polybutadiene-based thermoplastic elastomer, liquid polyisoprene, and liquid polybutadiene.

16. An illumination apparatus for an optical microscope, comprising:
an observation optical path having an objective lens for forming an enlarged image of a sample;
an illumination section for providing illumination light including ultraviolet light; and
a plurality of lenses provided in an optical path of the illumination light having the ultraviolet light, the plurality of lenses passing the ultraviolet light,
wherein at least one of the plurality of lenses is molded out of rubber and other lenses of the plurality of lenses are made of low-dispersed glass.

17. An illumination apparatus according to claim 16, wherein the illumination light provided by the illumination section is for use in an incident illumination system and the at least one of the plurality of lenses is provided in the incident illumination system.

18. An illumination apparatus according to claim 16, wherein one of the at least one of the plurality of lenses is oriented at a location most close to the illumination section with respect to other lenses.

19. An illumination apparatus according to claim 16, wherein one of the other lenses made of the low-dispersed glass is oriented at a location most close to the illumination section and one of the at least one of the plurality of lenses is oriented at a location second most close to the illumination section.

20. An illumination apparatus for an optical microscope, comprising:
an observation optical path having an objective lens for forming an enlarged image of a sample;
an illumination section for providing illumination light; and
a plurality of lenses provided in an optical path of the illumination light provided by the illumination section,
wherein at least one of the plurality of lenses is molded out of rubber.

21. An illumination apparatus according to claim 20, wherein the illumination light provided by the illumination section is for use in an incident illumination system and the at least one of the plurality of lenses is provided in the incident illumination system.

22. An illumination apparatus according to claim 20, wherein one of the at least one of the plurality of lenses is a collector lens having an aspheric surface.

23. An illumination apparatus according to claim 20, wherein one of the plurality of lenses is a collector lens, and wherein the collector lens comprises a first collector lens made of rubber of which at least one surface is aspheric, and a second collector lens made of glass.

24. An illumination apparatus according to claim 23, wherein the second collector lens made of glass is oriented at a position most close to the illumination section.

25. An illumination apparatus according to claim 23, wherein the first collector lens is oriented at a position most close to the illumination section.

26. An illumination apparatus according to claim 20, wherein one of the at least one of the plurality of lenses is a collector lens which is made of rubber.

* * * * *